(No Model.)
J. MACPHAIL.
VEHICLE WHEEL.
No. 352,141. Patented Nov. 9, 1886.
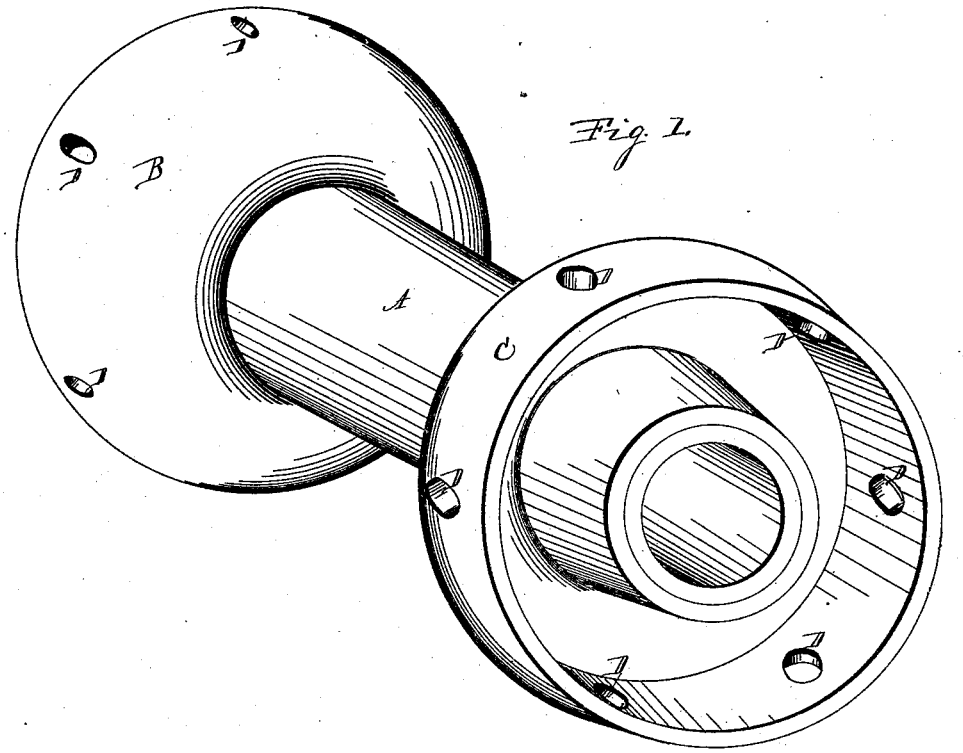
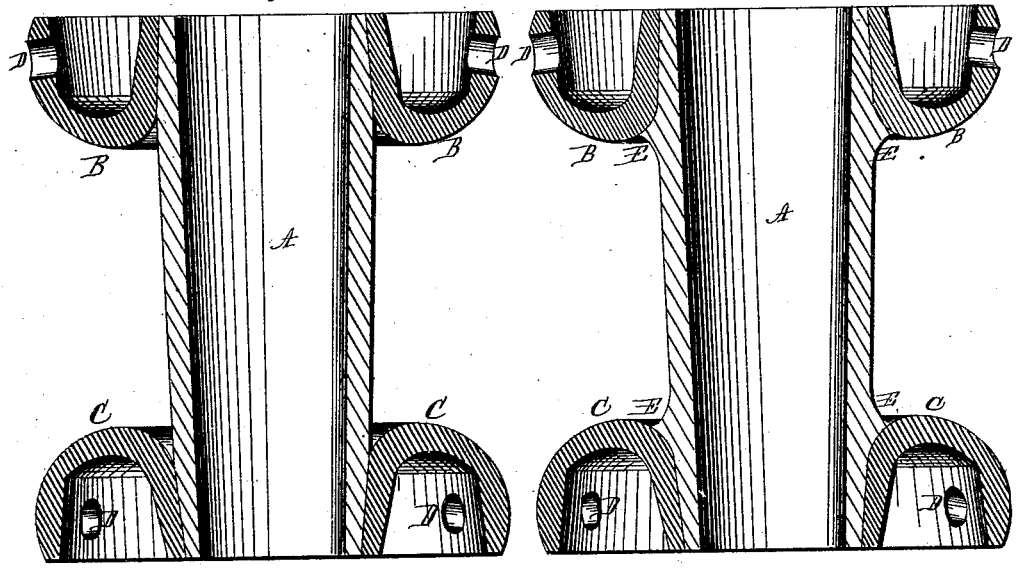
Witnesses.
P. A. D. Behel
A. O. Behel
Inventor.
James Macphail
Per Jacob Behel
Atty.

United States Patent Office.

JAMES MACPHAIL, OF ROCKFORD, ILLINOIS.

VEHICLE-WHEEL.

SPECIFICATION forming part of Letters Patent No. 352,141, dated November 9, 1886.

Application filed February 20, 1886. Serial No. 192,698. (No model.)

*To all whom it may concern:*

Be it known that I, JAMES MACPHAIL, a citizen of the United States, residing in the city of Rockford, in the county of Winnebago and State of Illinois, have invented a new and useful Improvement in Vehicle-Wheels, of which the following is a specification.

This invention relates to a class of wheels known as the "tension-wheel," largely employed in the manufacture of wheeled agricultural implements. Its object is to improve this class of wheels by the employment of a light-weight three-part hub of easy construction, capable of renewal in its several parts, but more especially in the parts most subject to wear. To this end I have designed and constructed the hub represented in the accompanying drawings, in which—

Figure 1 is an isometrical representation of a hub embodying my invention. Fig. 2 is a lengthwise central section, and Fig. 3 is also a lengthwise central section of my improved hub, showing a slight structural modification.

My improved hub consists, essentially, of a thimble, A, and removable heads B and C. The thimble A of my improved hub is of a construction to receive the axle-arm to revolve thereon in the usual manner, and, if required, it may be chambered in any of the known or usual forms. The end portions of the thimble are tapered or produced on its outer surface in truncated conic form of least diameter at their extreme ends. The end portions, B and C, of the hub are produced in annular ring form, and in section are of the horseshoe or U form, and their axial openings are of a conformation to receive the conic ends of the thimble snugly. Perforations D, to receive the inner ends of the spokes, are formed at proper intervals in the outer rim of the annular ring-hub ends.

The several parts consisting of the thimble A and the annular ring-hub ends are of a construction to permit their ready removal and the substitution of a new part when from any cause the part becomes unfit for use. As an instance, if the thimble becomes worn, it may be removed and a new one substituted, or if the annular ring-head ends, or either of them, become unfit for use, either or both of them may be removed and a new one put in its place.

The several parts of my improved hub are of a conformation to be produced from a small amount of material and of easy construction, by which I produce a reliable hub at a small cost and capable of renewal in all its parts.

In Fig. 3 the thimble portion is produced with annular enlargements E, to receive the inner portion of the annular ring-hub ends to give them position on the thimble ends. In this construction of my improved hub, the thimble ends are preferably produced in truncated conic form; but instead thereof the ends of the thimble may be produced in cylindrical form, and the hub ends produced to receive them.

I claim as my invention—

A three-part hub consisting of thimble to receive the axle-arm, and having its ends produced in truncated-cone form, and annular ring-hub ends of substantially U shape in cross-section, the inner side of each hub end being tapered to fit upon the thimble, while the outer side of each end is perforated, substantially as described.

JAMES MACPHAIL.

Witnesses:
A. O. BEHEL,
S. A. D. BEHEL.